US005884929A

United States Patent [19]

Kincaid

[11] Patent Number: 5,884,929

[45] Date of Patent: Mar. 23, 1999

[54] INVALID TRANSPORT

[76] Inventor: David W. Kincaid, 28258 187th St., Leavenworth, Kans. 66048

[21] Appl. No.: 711,041

[22] Filed: Sep. 10, 1996

[51] Int. Cl.[6] .......... B62M 1/14

[52] U.S. Cl. .......... 280/304.1; 280/250.1; 297/DIG. 4

[58] Field of Search .......... 280/304.1, 250.1; 297/DIG. 4; 414/921, 352

[56] References Cited

U.S. PATENT DOCUMENTS

| | | | |
|---|---|---|---|
| 3,758,894 | 9/1973 | Finley | 297/DIG. 4 |
| 3,854,152 | 12/1974 | Chez . | |
| 3,882,555 | 5/1975 | Edlund . | |
| 3,891,269 | 6/1975 | Moeser | 297/DIG. 4 |
| 3,936,893 | 2/1976 | Anderson et al. . | |
| 3,967,328 | 7/1976 | Cox . | |
| 4,010,499 | 3/1977 | Davis et al. . | |
| 4,101,143 | 7/1978 | Sieber . | |
| 4,266,305 | 5/1981 | Kavaloski et al. | 297/DIG. 4 |
| 4,278,387 | 7/1981 | Seguela et al. | 297/DIG. 4 |
| 4,365,924 | 12/1982 | Brigman et al. | 280/304.1 |
| 4,483,653 | 11/1984 | Waite . | |
| 4,606,082 | 8/1986 | Kuhlman | 280/304.1 |
| 4,699,425 | 10/1987 | Ohlson | 297/DIG. 4 |
| 4,951,766 | 8/1990 | Basedow et al. | 280/304.1 |
| 5,020,816 | 6/1991 | Mulholland . | |
| 5,058,221 | 10/1991 | Abraham | 280/304.1 |
| 5,060,960 | 10/1991 | Branscumb et al. . | |
| 5,096,008 | 3/1992 | Mankowski | 297/DIG. 4 |
| 5,201,084 | 4/1993 | Johnson . | |
| 5,201,087 | 4/1993 | Wickham et al. . | |
| 5,664,266 | 9/1997 | Williams et al. | 297/DIG. 4 |
| 5,669,620 | 9/1997 | Robbins . | |

*Primary Examiner*—Daniel G. DePumpo

*Attorney, Agent, or Firm*—Hovey, Williams Timmons & Collins

[57] ABSTRACT

A wheelchair construction is disclosed for facilitating transfer of a person to and from the wheelchair. The wheelchair includes a mobile frame, a chair assembly for supporting a person in a sitting position, and mechanism shiftably supporting the chair assembly on the frame. The mechanism supports the chair assembly for movement between a transport position, in which the chair assembly is positioned generally over the frame, and a transfer position, in which the chair assembly is positioned laterally outwardly from the frame.

18 Claims, 2 Drawing Sheets

INVALID TRANSPORT

BACKGROUND OF THE INVENTION

1. Field of the Invention

The present invention relates generally to wheelchairs for transporting invalids and, more particularly, to a wheelchair having a chair assembly that is shiftable relative to the frame along a generally horizontal path for facilitating transfer of an individual to and from a support surface, such as an automobile passenger seat or a hospital bed.

2. Discussion of Prior Art

Wheelchairs are used in various circumstances to assist with the transport of persons from one location to another. In many instances, the wheelchair serves to transport a person to and from a support surface, such as an automobile passenger seat, a hospital bed, etc. It is, of course, necessary to safely transfer the person from the support surface to the chair, or vice versa. With conventional wheelchair designs, however, the safe transfer of a person to and from the wheelchair is often very difficult. Such transfer is particularly problematic with highly debilitated persons.

A conventional wheelchair typically includes a wheeled frame having a pair of rear drive wheels and a pair of relatively smaller front castor wheels, a chair for supporting a person in a sitting position, and footrests upon which the person places her feet during transport. The chair faces forwardly and is attached to the frame in a position generally between the front and rear wheels for stability purposes. Furthermore, the chair is traditionally surrounded on all but its forward side by a pair of armrests and a chair back, all of which project upwardly from the chair. The footrests traditionally extend forwardly from the frame ahead of the front wheels for supporting the persons feet above the ground during transport. A conventional footrest includes a bar fixed to the frame and a pedal swingably supported on the bar for swinging movement about a substantially horizontal, fore-and-aft axis. Such a configuration allows for swinging of the pedal between a substantially horizontal foot supporting position and an upright position, in which the pedal is swung out of the foot supporting position so that the person's feet may be placed on the ground between the upright pedals during transfer of the person to and from the wheelchair.

Thus, transfer of a person to and from the wheelchair requires that the person be moved in a generally fore-and-aft direction into and out of a sitting position. For example, to transfer a person from a support surface to the wheelchair, the wheelchair is placed in close proximity to the support surface and the pedals are swung to the upright position. Subsequently, the person raises from a recumbent position on the support surface to her feet and walks, in most cases with assistance, to the wheelchair. The person is positioned relative to the wheelchair so that her legs and feet are between the upright pedals and bars of the footrests and her backside faces the chair. The person is finally lowered to a sitting position on the chair and the pedals are swung to a foot supporting position. Of course, transfer of a person from the wheelchair to a support surface is essentially the reverse of the steps set forth above.

The conventional wheelchair design, as hereinabove described, is highly problematic, particularly with regard to transfer of the patient to and from the wheelchair. As evident from the description, the person must step between the footrests when being transferred to and from the wheelchair. This can indeed be very difficult and unsafe for persons who are not highly agile. Furthermore, some wheelchair configurations have the front wheels positioned forwardly of the frame so that the person must also maneuver between the front wheels when being transferred to and from the wheelchair.

Conventional wheelchairs are also problematic in the sense that most wheelchair constructions prevent placement of the chair adjacent the support surface, whereby the person can simply slide from the support surface to the chair, or vice versa. That is, the wheelchair components extending forwardly beyond the chair prevent the unobstructed forward side of the chair from being placed alongside the support surface, such that transfer of a person to and from the wheelchair necessarily involves raising the person to her feet and moving the person between the footrests.

It will be appreciated that conventional footrests also present an obstacle for care providers that assist the person. Of course, the care provider, along with the person, must avoid tripping over the footrests during transfer. Moreover, in instances where it is desired to place the wheelchair as near the support surface as possible so as to minimize movement of the person, the support surface, chair and footrests define an essentially enclosed area that prevents optimum location of the care provider immediately behind or in front of the person during transfer. The location of the wheelchair relative to a support surface, and the access to the person during transfer to and from the wheelchair afforded the care provider are attributes of the wheelchair which supplant, rather than supplement, one another. That is proximity of the chair relative to the support surface must be sacrificed in favor of unobstructed access to the person, and vice versa. For example, a person demanding a significant amount of assistance requires that the wheel chair be spaced sufficiently away from the support surface to provide the care provider with the access to assist the person. However, because of the necessary spacing of the wheelchair from the support surface for accommodating the care provider, the person must move a greater distance during transfer to and from the wheelchair.

OBJECTS AND SUMMARY OF THE INVENTION

Responsive to these and other problems, an important object of the present invention is to provide a wheelchair that is safe and durable, yet inexpensive to manufacture. Another object of the present invention is to provide a wheelchair design that facilitates transfer of a person to and from the chair. Yet another object of the present invention is to provide a wheelchair that allows the person to be transferred to and from the chair without requiring the person to move between the footrests and other structure projecting forwardly from the wheelchair frame. An additional object of the present invention is to provide a wheelchair construction that allows the chair to be placed adjacent the support surface without sacrificing access to the person. A further object of the present invention is to provide a wheelchair having a shiftable chair that may be positioned laterally outwardly from the frame of the wheelchair. Preferably, the chair is shiftable in a fore-and-aft direction so that it may be positioned forwardly of the footrests and other components extending from the front of the wheelchair frame. Another object of the present invention is to provide a wheelchair having a chair that is rotatable relative to the frame.

In accordance with these and other objects evident from the following description of a preferred embodiment of the invention, the wheelchair includes a mobile frame, a chair assembly for supporting a person in a sitting position, and mechanism shiftably supporting the chair assembly on the frame. The mechanism allows the chair assembly to be moved between a transport position, in which the chair assembly is positioned generally over the frame, and a transfer position, in which the chair assembly is positioned laterally outwardly from the frame. The frame of the wheelchair may include a pair of rear drive wheels and at least one relatively smaller front wheel. With this construction, the chair assembly is located forwardly of the at least one front wheel when in the transfer position.

If desired, the mechanism includes a turntable device supporting the chair assembly for rotational movement about a vertical axis. The frame includes a stop adapted to engage the chair assembly when the assembly is in its transport position for restricting the rotational movement.

The preferred mechanism comprises an extendable and retractable unit including an elongated first member fixed to the frame and at least one additional elongated member supporting the chair assembly, with the at least one additional member being longitudinally shiftable relative to the first member. The extendable and retractable unit preferably takes the form of a slide track assembly.

A stabilizer apparatus extending forwardly from the frame may be provided to engage the surface upon which the wheels are supported for preventing tipping of the frame in the forward direction. The preferred stabilizer apparatus includes an outrigger element and a releasable clamping device affixed to the frame. The device releasably clamps about the outrigger element for allowing selective shifting of the element into and out of a stabilizing position, in which the element engages the surface.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figures 1, 2:
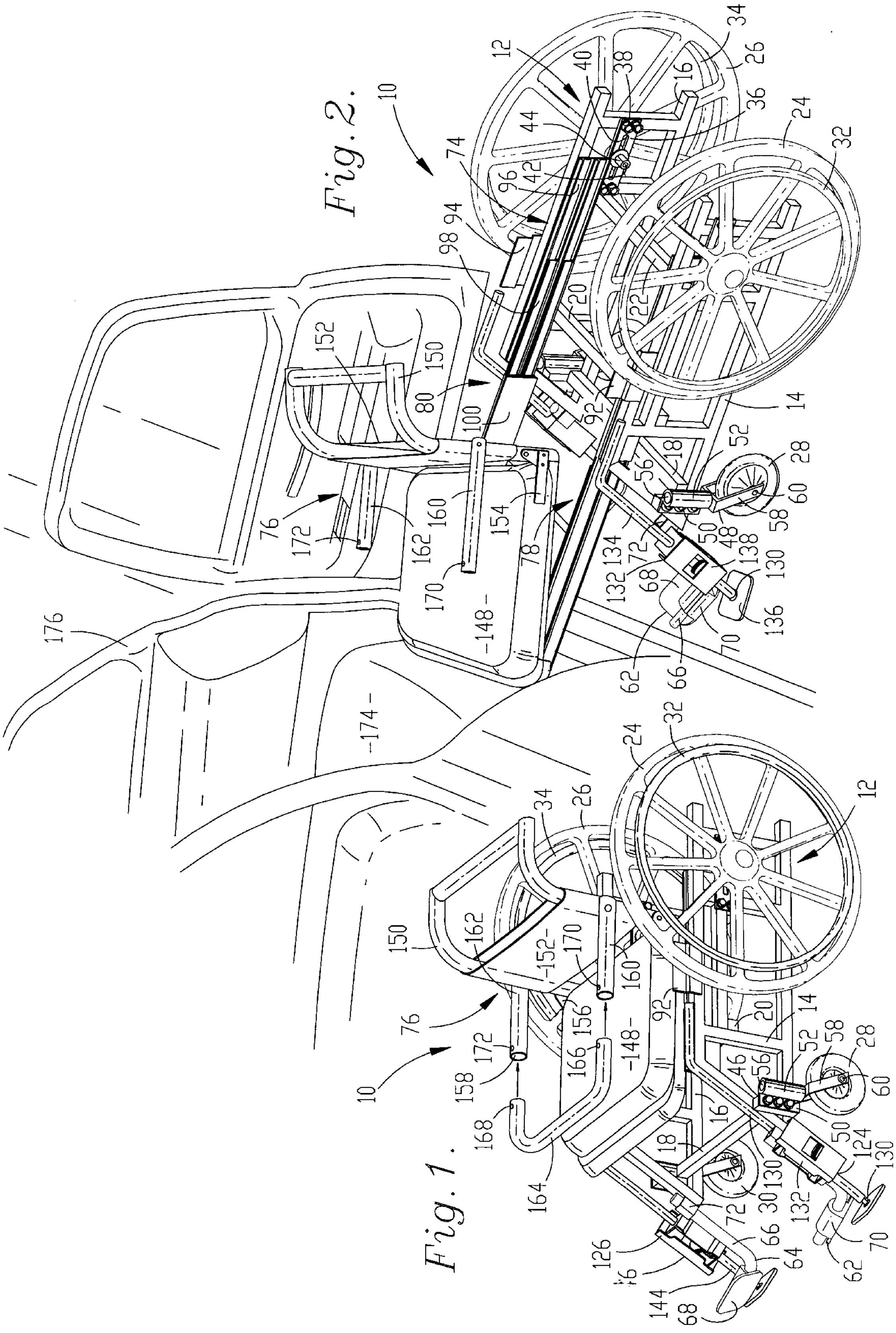
FIG. 1 is a perspective view of a wheelchair constructed in accordance with the principles of the present invention and showing the chair assembly in its transport position.
FIG. 2 is a perspective view of the wheelchair illustrated in FIG. 1, but showing the chair assembly in a slightly rotated, transfer position adjacent the passenger seat of an automobile.

The invalid transport or wheelchair 10 selected for illustration generally includes a wheeled frame, broadly designated by the numeral 12, having a pair of laterally spaced, fore-and-aft extending subframe structures 14,16 which are interconnected by a plurality of laterally extending crossbars 18,20,22. The subframe structures 14,16 preferably comprise a lattice of metal, square-shaped tubing sections attached to one another by suitable means, such as welding or bronzing. The crossbars 18,20,22 are similarly formed of metal, square-shaped tubing sections. It will be appreciated, however, that the principles of the present invention are equally applicable to other variously constructed wheelchair frames formed of other suitable materials.

A pair of rear drive wheels 24,26 and a pair of relatively smaller front castor wheels 28,30 provide mobility to the frame 10. The rear drive wheels 24,26 are spoked and include respective gripping rings 32,34 which allow the transported person to impart rotational movement to the drive wheels 24,26. For the sake of brevity, the description of the means for rotatably mounting the drive wheels 24 and 26 to the subframe structures 14 and 16, respectively, focuses only on the right wheel 26, with the understanding that the means for mounting the left wheel 24 is essentially identical to the means for mounting the right wheel. A mounting plate 36 (see FIG. 2) is attached to the subframe structure 16 by bolt assemblies 38. The mounting plate 36 has a slotted opening 40 that receives a wheel axle 42 for mounting the drive wheel 26 to the respective subframe structure 16. The innermost end of the axle 42 is externally threaded for receiving an internally threaded connecting nut 44 for fixedly securing the axle 42 to the stationary mounting plate 36. A bearing assembly (not shown) housed within the hub of the drive wheel 26 journals the axle 42 so as to allow rotation of the wheel relative to the shaft. The frame 12 serves to maintain the wheels generally aligned along the fore-and-aft direction.

The front castor wheels 28,30, on the other hand, are allowed to swing freely about a generally vertical axis so that the wheelchair 10 may be turned from side-to-side. The description of the means for swingably and rotatably mounting the castor wheels 28 and 30 to the subframe structures 14 and 16, respectively, will focus on only the left wheel 28, with the understanding that the means for mounting the right wheel 30 is essentially identical to the means for mounting the left wheel. Particularly, the means for swingably and rotatably mounting the left castor wheel 28 to the left subframe 14 includes a mounting bracket 46 and a spindle assembly 48. The mounting bracket 46 has a flat plate portion 50 and an elongated tubular sleeve portion 52, with the plate portion 50 being fastened to the left subframe by a set of bolt assemblies 54. The spindle assembly 48 has an elongated shaft portion 56 that is slidably received within the sleeve portion 52 of the mounting bracket 46. It will be appreciated that the shaft portion 56 is provided with known structure for preventing longitudinal shifting of the shaft portion relative to the sleeve portion 52 of the mounting bracket (i.e., vertical shifting), while allowing rotational movement of the shaft portion 56 relative to the sleeve portion 52. The spindle assembly 48 further includes a yoke portion 58 which receives the left castor wheel 28. An axle 60 extending between the legs of the yoke portion 58 serves to mount the castor wheel 28 to the spindle assembly 48. The axle 60 is journaled by a bearing assembly (not shown) housed within the hub of the left castor wheel 28 for allowing unrestricted rotational movement of the wheel relative to the axle. As previously indicated, the spindle assembly 48 may swing freely about a generally vertical axis.

Extending from the front of the frame 12 are a pair of footrests 62 and 64 which serve to support the person's feet off the ground during transport. Each of the footrests 62 or 64 includes an L-shaped mounting rod 66 and a pedal 68 upon which the person places her feet during transport. A tubular block 72 fixed to the frame 12 receives the general upright leg of the mounting rod 66 for rigidly attaching the mounting rod 66 to the frame. The pedal 68 includes a tubular sleeve portion 70 that is friction-fit to the laterally extending leg of the mounting rod 66 for allowing swinging movement of the pedal about the rod. Accordingly, the pedal 68 is swingable between a generally horizontal foot-supporting position and an upright position.

Figure 3:
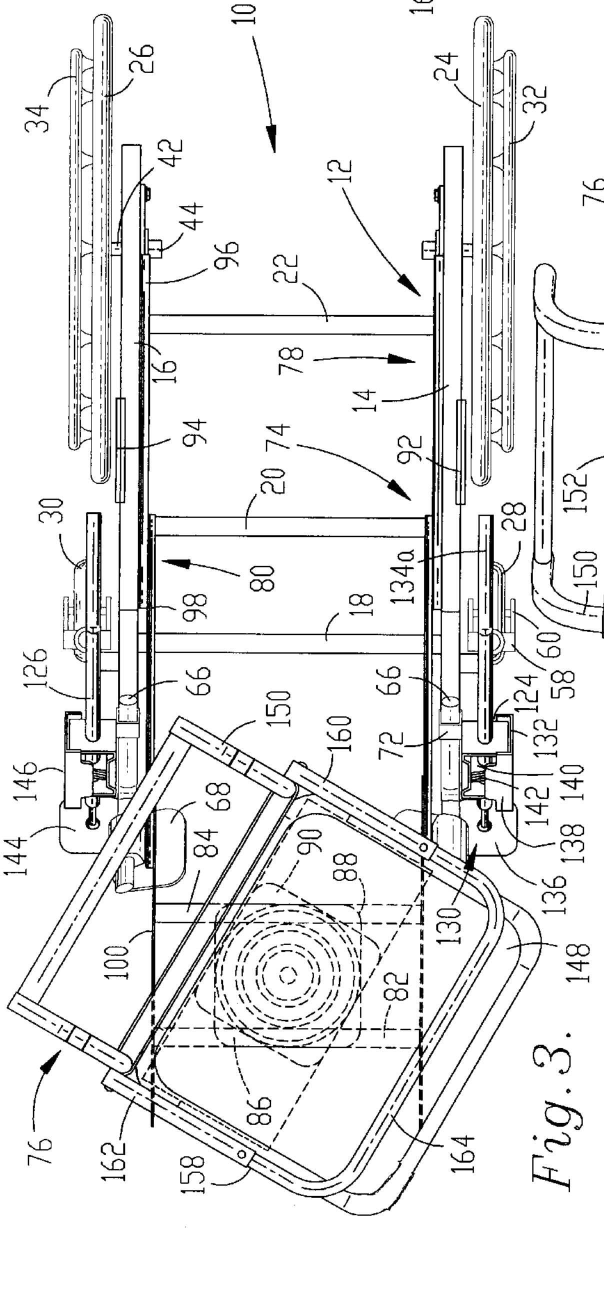
FIG. 3 is an enlarged, top plan view of the wheelchair having the chair assembly in the same position depicted in FIG. 2, particularly illustrating in phantom lines the turntable device rotatably supporting the chair assembly.

The wheelchair 10 includes mechanism, generally denoted by the numeral 74, for shiftably supporting a chair assembly 76 on the frame 12 for movement in a generally horizontal, fore-and-aft direction. In the illustrated embodiment, the mechanism 74 includes a laterally spaced pair of extendable and retractable slide track assemblies 78 and 80. As perhaps best shown in FIG. 3, a pair of transverse bars 82 and 84 connected between the slide track assemblies 78,80 support a turntable device, generally denoted by the numeral 86. The turntable device 86 includes a lower section 88 fixed to the bars 82,84, and a relatively rotatable upper section 90 fixed to the undersurface of the chair assembly 76. Specifically, a bearing assembly (not shown) is disposed between the upper and lower sections 88 and 90 for allowing such rotational movement. Although the turntable device 86 supports the chair assembly 76 for rotational movement about a generally vertical axis, such rotational movement is restricted when the chair assembly 76 is positioned over the frame 12 by a pair of stops 92 and 94. The stops 92 and 94 are connected to the subframe structures 14 and 16, respectively, by suitable means such as welding or mechanical fasteners. The stops 92 and 94 extend upwardly from the respective subframe structures 14 and 16 for abuttingly engaging the chair assembly 76 when it is swung from side-to-side over the frame 12.

Figure 5:
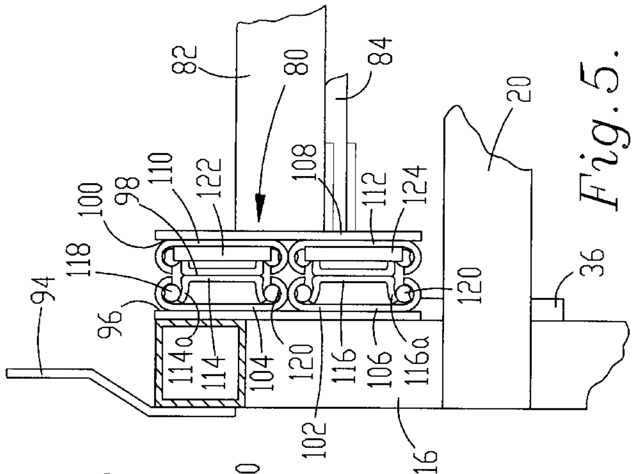
FIG. 5 is a enlarged, fragmentary, front elevational view of the left side of the wheelchair, particularly illustrating the details of construction of the mechanism for shiftably supporting the chair assembly on the frame.

Turning particularly to the slide track assemblies 78 and 80, each slide track assembly is connected between the respective subframe structure 14 or 16 and the transverse bars 82,84. The assemblies 78 and 80 are similarly constructed, and accordingly, it shall be sufficient to describe only the right slide track assembly 80, the details of construction of which are illustrated in FIG. 5. The slide track assembly 80 generally comprises three elongated rails 96,98, 100 which are longitudinally shiftable relative to one another. The first rail 96 consists of a plate 102 fixed to the subframe structure 16, and a pair of upper and lower C-shaped retainers 104 and 106 fixed to the plate 102. Similarly, the third rail 100 consists of a plate 108 fixed to the transverse bars 82,84, and a pair of upper and lower C-shaped retainers 110 and 112 fixed to the plate 108. The slide track assembly 80 is configured so that the C-shaped retainers 104,106 of the first rail 96 face the C-shaped retainers 110,112 of the third rail 100. The second rail 98 has a pair of upper and lower, generally H-shaped retainers 114 and 116 positioned between the C-shaped retainers of the first and third rails. Each H-shaped retainer 114 and 116 includes four legs **114*a* and 116*a* (only two of such legs for each retainer being shown in FIG.5) which flare slightly outwardly toward the curved ends of the respective C-shaped retainer. A series of longitudinally spaced ball bearings 118 are retained within the tracks defined between each curved end of the C-shaped retainers and the corresponding flared leg of the H-shaped retainers. The upper and lower curved ends of each of the C-shaped retainers have a pair of longitudinally spaced projections 120 (only the front projections being illustrated in FIG. 5) that limit movement of the ball bearings 118** within the tracks.

Thus, the second rail 98 is shiftably interposed between the first rail 96 and the third rail 100. With the first rail 96 fixed to the subframe structure 16, the second rail 98 is shiftable relative to the frame 12 in a fore-and-aft direction. The third rail 100 is in turn shiftable relative to the second rail 98 for providing yet further shifting of the chair assembly 76 relative to the frame 12. As shown in FIG. 5, a pair of upper and lower sliding brakes 122 and 124 project inwardly from respective C-shaped retainers 110 and 112 for abuttingly engaging the H-shaped retainers 114 and 116 to restrict rearward shifting of the third rail 100 beyond the second rail 98. The C-shaped retainers 104 and 106 of the first rail similarly include brakes (not shown) for restricting rearward shifting of the second rail beyond the first rail. The brakes 124 cooperatively limit travel of the chair assembly 76 beyond a transport position, in which the assembly is positioned generally over the frame 12 between the real wheels 24,26 and front wheels 28,30. In much the same manner, the C-shaped retainers of the first and third rails and the H-shaped retainers of the second rail include stops or brakes (not shown) for limiting forward shifting of the second rail relative to the first rail, and forward shifting of the third rail relative to the second rail. Consequently, forward travel of the chair assembly 76 is prevented beyond a transfer position (see FIGS. 2–4), in which the assembly is positioned forwardly of the footrests 62,64 and front wheels 28,30.

Figure 4:
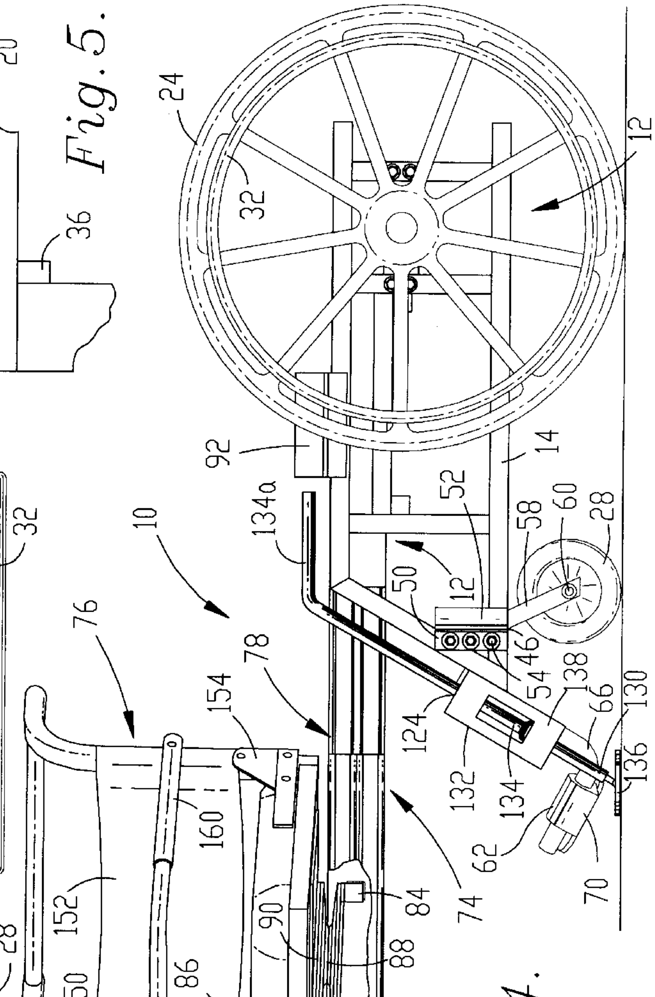
FIG. 4 is a side elevational view of the wheelchair illustrated in FIG. 3, particularly showing the outrigger element of the stabilizer apparatus in a stabilizing position.

A pair of stabilizer apparatuses 126 and 128 are provided on the front end of the frame 12 for preventing tipping of the wheelchair 10 when the chair assembly 76 is in its transfer position. As shown in FIG. 4, the left stabilizer apparatus 126 includes an outrigger element 130 and a clamping device 132 affixed to the left subframe structure 14. The clamping device 132 releasably clamps about the outrigger element 130 so as to allow selective shifting of the element into and out of a stabilizing position, in which the element engages the ground (shown in FIG. 4).

The outrigger element 130 specifically includes a post 134 presenting an upper handle portion **134*a*, and a foot 136 connected to the lower end of the post 134 via a ball-in-socket connection. The ball-in-socket connection allows the foot 136 to lie flatly against slight angles or undulations in the ground when the outrigger element 130 is placed in its stabilizing position. The clamping device 132, on the other hand, includes a housing 138 that slidably receives the post 134 of the outrigger element 130. Contained within the housing 138 are a locking tab 140 and a helical spring 142 for biasing the tab into a canted or locked position. It will be appreciated that in the locked position, the tab 140 bights about the post 134 to prevent relative shifting of the outrigger element 130. However, the tab 140 may be manually shifted to an unlocked position, in which the tab releases the post 134 to allow shifting of the outrigger element 130. The right stabilizer apparatus 128 includes a similar outrigger element 144 and clamping device 146**, and accordingly, will not be described in detail herein.

The chair assembly 76 may be variously constructed, however, it preferably includes a generally horizontal cushioned seat 148 upon which a person is supported in a sitting position. The seat 148 is mounted by suitable means, such as mechanical fasteners (not shown), to the upper section 90 of the turntable device 86. A generally U-shaped bar 150 extends upwardly from the rear edge of the seat 148. The bight portion of the bar 150 projects rearwardly to present a handle which may be used by a care provider for moving the wheelchair 10. Extending between the flanges of the bar 150 is a web 152 of flexible material, such as cloth or nylon, which forms a chair back. A pair of angled braces 154,156 removably connected between the seat 148 and bar 150 support the bar in its upright position, while allowing selective swinging of the bar to a collapsed position in which the bar lies against the seat.

As shown in FIG. 5, the rear transverse bar 84 is positioned slightly lower than the front transverse bar 82 so that the chair assembly 76 tilts slightly rearwardly. It will be appreciated that the slight rearward tilt of the chair assembly 76 further minimizes the risk of the wheelchair tilting forwardly during transfer of a person to and from the wheelchair.

A removable patient-retaining and safety enclosure 158 projects forwardly from the bar 150 to prevent the patient from accidentally falling from the chair assembly 76. The enclosure 158 includes a pair of tubular sleeves 160 and 162, each of which are pivotally attached to a respective flange of the bar 150. The sleeves are locked in the illustrated horizontal position by suitable structure, such as a removable locking pin (not shown) extending through the sleeve and flange. The enclosure 158 further includes a removable U-shaped rod 164 which is cooperatively received within the sleeves 160 and 162. The terminal ends of the rod 164 include detent balls 166 and 168 which are received in openings 170 and 172 defined within the sleeves 160 and 162, respectively, for releasably retaining the rod to the sleeves.

The wheelchair 10 is traditionally utilized to transport a person from one location to another location. For example, a patient is often transported by a wheelchair from an automobile to a hospital bed. For the purposes of the following description, it will be assumed that the wheelchair is stored with the chair assembly 76 in the transport position over the frame 12 and the outrigger elements 130 and 144 of the respective stabilizer apparatuses 126 and 128 shifted out of the stabilizing position (see FIG. 1).

Accordingly, the transfer of a person from a support surface, such as an automobile seat to the wheelchair 10 initially involves placing the wheelchair near the support surface. A brake (not shown) associated with each drive wheel 24 and 26 traditionally serves to maintain the wheelchair in the desired location. Once the brakes are set, the stabilizer apparatuses 126,128 are arranged to prevent tipping of the wheelchair 10 in the forward direction. Particularly, the locking tabs 140 of the clamping devices 132,146 are manually depressed against the bias of the springs 142 to a release position so that the outrigger elements 130,144 may be placed in the stabilizing position. While the tabs 140 are depressed, the outrigger elements 130,144 are grasped by their handle portion **134*a* and shifted downwardly until the foot 136 lies flatly against the floor or ground. The U-shaped rod 164 of the safety enclosure 158 is removed and set aside. The chair assembly 76 is then shifted forwardly to the transfer position (see FIGS. 2–4**).

In the transfer position, the chair assembly 76 may be located along side the support surface. As shown in FIG. 2, the chair assembly 76 is located alongside the seat 174 of the automobile 176 so that the seat 174 and seat 148 of the chair assembly 76 present a generally continuous surface. Accordingly, the person may simply slide from the seat 174 to the seat 148. If it is necessary to raise the person to her feet during transfer to and from the wheelchair 10, the chair assembly 76 is simply moved away from the support surface so that the person has sufficient space to rise to her feet, and then the chair assembly 76 is shifted to a convenient position so the person may sit down. Because the chair assembly 76 is both rotatable about a vertical axis and shiftable along a horizontal path relative to the frame 12, the frame may be located in a number of positions spaced from the support surface so as to afford the care provider with ready and unobstructed access to the person, without sacrificing the placement of the chair assembly proximal to or alongside the support surface. As perhaps best shown in FIG. 4, with the chair assembly 76 in its transfer position, the seat 148 is positioned significantly forward of the front wheels 28,30 and footrests 62,64. Such an arrangement drastically reduces the risk of the person or the care provider tripping over the wheels 28,30 or footrests 62,64.

Once the person is positioned on the seat 148 in a sitting position, the U-shaped rod 164 of the safety enclosure 158 is inserted within the sleeves 160,162 until the detent balls 166 and 168 snap into the respective openings 170 and 172. The chair assembly 76 is subsequently returned to its transport position. It will be appreciated that a locking device, such as a locking pin (not shown) removably connected to one or both of the slide track assemblies 78,80, is provided for releasably securing the chair assembly 76 in the transport and transfer positions. Once the chair assembly is secured in its transport position, the outrigger elements 130,144 are moved out of the stabilizing position simply by depressing the tabs and shifting the elements upwardly. Finally, the drive wheel brakes are released and the person is transported. The process of transferring the person from the wheelchair 10 to the support surface is essentially the reverse of the steps set forth hereinabove.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the principles of the present invention may be utilized on various other wheelchair constructions, such as motorized wheelchairs. It is also entirely within the ambit of the present invention to utilize one slide track assembly, rather than two. Furthermore, the mechanism for shiftably supporting the chair assembly 76 on the frame may comprise a pneumatic or hydraulic cylinder, rather than the slide track arrangement of the illustrated embodiment.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An invalid transport comprising:

a mobile frame;

a chair assembly for supporting a person in a sitting position;

a mechanism shiftably supporting the chair assembly on the frame for movement between a transport position, in which the chair assembly is positioned generally over the frame, and a transfer position, in which the chair assembly is positioned laterally outwardly from the frame, said mechanism including a turntable device supporting the chair assembly for rotational movement about a substantially vertical axis, said mechanism including an extendable and retractable unit comprising an elongated first member fixed to the frame and at least one additional elongated member supporting the chair assembly, said at least one additional member being longitudinally shiftable relative to the first member, said unit comprising a slide track assembly.

2. An invalid transport as claimed in claim 1, said frame including a stop adapted to engage the chair assembly when the assembly is in its transport position for restricting said rotational movement.

3. An invalid transport as claimed in claim 1; and stabilizer apparatus extending laterally outwardly from the frame in a generally similar direction as the chair assembly when in the transfer position, said stabilizer apparatus being adapted to engage the surface upon which the frame is supported for preventing tipping of the frame in said direction.

4. An invalid transport as claimed in claim 3, said stabilizer apparatus including an outrigger element and a releasable clamping device affixed to the frame, said clamping device releasably clamping about the outrigger element for allowing selective shifting of the outrigger element into and out of a stabilizing position, in which the element engages the surface.

5. An invalid transport comprising:

a mobile frame;

a chair assembly for supporting a person in a sitting position;

a mechanism shiftably supporting the chair assembly on the frame for movement between a transport position, in which the chair assembly is positioned generally over the frame, and a transfer position, in which the chair assembly is positioned laterally outwardly from the frame, said mechanism including a turntable device supporting the chair assembly for rotational movement about a substantially vertical axis, said mechanism including an extendable and retractable unit comprising an elongated first member fixed to the frame and at least one additional elongated member supporting the chair assembly, said at least one additional member being longitudinally shiftable relative to the first member, stabilizer apparatus extending laterally outwardly from the frame in a generally similar direction as the chair assembly when in the transfer position, said stabilizer apparatus being adapted to engage the surface upon which the frame is supported for preventing tipping of the frame in said direction, said stabilizer apparatus including an outrigger element and a releasable clamping device affixed to the frame, said clamping device releasably clamping about the outrigger element for allowing selective shifting of the outrigger element into and out of a stabilizing position, in which the element engages the surface.

6. An invalid transport as claimed in claim 5, said unit comprising a slide track assembly.

7. An invalid transport as claimed in claim 6, said frame including a pair of spaced support structures, said mechanism including a pair of said slide track assemblies, each having said first member fixed to a respective one of said structures.

8. In a wheelchair for transporting a person, the improvement comprising:

a wheeled frame including a pair of rear drive wheels and at least one relatively smaller front wheel;

a chair assembly for supporting the person in a sitting position;

a mechanism shiftably supporting the chair assembly on the frame for generally horizontal movement between a transport position, in which the chair assembly is positioned generally over the frame between the front and rear wheels and a transfer position, in which the chair assembly is positioned forwardly of the at least one front wheel, said mechanism including a turntable device supporting the chair assembly for rotational movement about a substantially vertical axis, said mechanism including an extendable and retractable unit comprising an elongated first member fixed to the frame and at least one additional elongated member supporting the chair assembly, said at least one additional member being longitudinally shiftable relative to the first member in a fore-and-aft direction, said unit comprising a slide track assembly.

9. In a wheelchair as claimed in claim 8, said frame including a stop adapted to engage the chair assembly when the assembly is in its transport position for restricting said rotational movement.

10. In a wheelchair as claimed in claim 8, stabilizer apparatus extending forwardly from the frame, said stabilizer apparatus being adapted to engage the surface upon which the wheels are supported for preventing tipping of the frame in the forward direction.

11. In a wheelchair for transporting a person, the improvement comprising:

a wheeled frame including a pair of rear drive wheels and at least one relatively smaller front wheel;

a chair assembly for supporting the person in a sitting position;

a mechanism shiftably supporting the chair assembly on the frame for generally horizontal movement between a transport position, in which the chair assembly is positioned generally over the frame between the front and rear wheels, and a transfer position, in which the chair assembly is positioned forwardly of the at least one front wheel, said mechanism including a turntable device supporting the chair assembly for rotational movement about a substantially vertical axis, said mechanism including an extendable and retractable unit comprising an elongated first member fixed to the frame and at least one additional elongated member supporting the chair assembly, said at least one additional member being longitudinally shiftable relative to the first member in a fore-and-aft direction, stabilizer apparatus extending laterally outwardly from the frame in a generally similar direction as the chair assembly when in the transfer position, said stabilizer apparatus being adapted to engage the surface upon which the frame is supported for preventing tipping of the frame in said direction, said stabilizer apparatus including an outrigger element and a releasable clamping device affixed to the frame, said clamping device releasably clamping about the outrigger element for allowing selective shifting of the outrigger element into and out of a stabilizing position, in which the element engages the surface.

12. In a wheelchair as claimed in claim 11, said unit comprising a slide track assembly.

13. In a wheelchair as claimed in claim 12, said frame including a pair of spaced support structures, each coupled with a respective one of said drive wheels, said mechanism including a pair of said slide track assemblies, each having said first member fixed to a respective one of said structures.

14. An invalid transport comprising:

a mobile frame;

a chair assembly for supporting a person in a sitting position;

an extendable and retractable unit comprising a first member fixed to the frame and a second member shiftably coupled to the first member; and a turntable device supporting the chair assembly on the second member so that said chair assembly is shiftable relative to the frame between a transport position, in which the chair assembly is positioned generally over the frame, and a transfer position, in which the chair assembly is positioned outwardly from the frame, said turntable device rotatably supporting the chair assembly on the second member for rotational movement about a substantially vertical axis that shifts with the chair assembly between the transport and transfer positions.

15. An invalid transport as claimed in claim 14, said unit comprising a slide track assembly.

16. An invalid transport as claimed in claim 14, said frame including a stop adapted to engage the chair assembly when the assembly is in its transport position for restricting said rotational movement.

17. An invalid transport as claimed in claim 14; and stabilizer apparatus extending outwardly from the frame in a generally similar direction as the chair assembly when in the transfer position, said stabilizer apparatus being adapted to engage the surface upon which the frame is supported for preventing tipping of the frame in said direction.

18. An invalid transport as claimed in claim 17, said stabilizer apparatus including an outrigger element and a releasable clamping device affixed to the frame, said clamping device releasably clamping about the outrigger element for allowing selective shifting of the outrigger element into and out of a stabilizing position, in which the element engages the surface.

* * * * *